US011451730B2

United States Patent
Malinge et al.

(10) Patent No.: US 11,451,730 B2
(45) Date of Patent: Sep. 20, 2022

(54) IMAGE SENSOR USING A GLOBAL SHUTTER AND METHOD FOR CONTROLLING SAME

(71) Applicants: STMICROELECTRONICS (GRENOBLE 2) SAS, Grenoble (FR); STMICROELECTRONICS (CROLLES 2) SAS, Crolles (FR)

(72) Inventors: Pierre Malinge, Bernin (FR); Frederic Lalanne, Bernin (FR); Laurent Simony, Grenoble (FR)

(73) Assignees: STMicroelectronics (Grenoble 2) SAS, Grenoble (FR); STMicroelectronics (Crolles2) SAS, Crolles (FR)

( * ) Notice: Subject to any disclaimer, the term of this patent is extended or adjusted under 35 U.S.C. 154(b) by 0 days.

(21) Appl. No.: 16/890,877

(22) Filed: Jun. 2, 2020

(65) Prior Publication Data

US 2020/0382738 A1 Dec. 3, 2020

(30) Foreign Application Priority Data

Jun. 3, 2019 (FR) ...................................... 1905868

(51) Int. Cl.
*H04N 5/3745* (2011.01)
*H04N 5/355* (2011.01)

(52) U.S. Cl.
CPC ....... *H04N 5/37452* (2013.01); *H04N 5/3559* (2013.01)

(58) Field of Classification Search
CPC ...... H04N 5/374; H04N 5/341; H04N 5/3559; H04N 5/37452; H04N 5/3575;

(Continued)

(56) References Cited

U.S. PATENT DOCUMENTS 6,727,946 B1 4/2004 Zhao et al.
6,919,551 B2 7/2005 Barna et al.
(Continued)

FOREIGN PATENT DOCUMENTS

CN 102695000 A 9/2012
CN 205159324 U 4/2016
(Continued)

OTHER PUBLICATIONS

U.S. Appl. No. 16/890,944, filed Jun. 2, 2020, Image Sensor and Method for Controlling Same.
(Continued)

*Primary Examiner* — Antoinette T Spinks
(74) *Attorney, Agent, or Firm* — Seed IP Law Group LLP

(57) ABSTRACT

An image sensor includes pixels each including: a first transistor and a first switch that are connected in series between a first node configured to receive a first potential and an internal node of the pixel, a gate of the first transistor being coupled with a floating diffusion node of the pixel; a capacitive element, a first terminal of which is connected to the floating diffusion node of the pixel; and several assemblies each including a capacitance connected in series with a second switch coupling the capacitance to the internal node. The sensor also includes a control circuit configured to control, each time a voltage is stored in one of the assemblies of a pixel, an increase of a determined value of a difference in potential between the floating diffusion node and the internal node of the pixel.

20 Claims, 8 Drawing Sheets

(58) Field of Classification Search
CPC ...... H04N 5/369; H04N 5/378; H04N 5/3696; H04N 5/3745; H04N 5/376; H01L 27/14612; H01L 27/14609; H01L 27/14601; H01L 27/146
See application file for complete search history.

(56) References Cited

U.S. PATENT DOCUMENTS

| | | | |
|---|---|---|---|
| 10,200,644 B2 | 2/2019 | Do et al. | |
| 2001/0033337 A1 | 10/2001 | Sakuragi | |
| 2004/0207740 A1 | 10/2004 | Rossi | |
| 2004/0263656 A1 | 12/2004 | Simony | |
| 2005/0270394 A1 | 12/2005 | Dierickx et al. | |
| 2007/0041063 A1* | 2/2007 | Kitada | H01L 27/307 358/482 |
| 2008/0122962 A1 | 5/2008 | Shah | |
| 2010/0097508 A1* | 4/2010 | Yanagita | H01L 27/14641 348/301 |
| 2011/0242381 A1 | 10/2011 | Sakakibara et al. | |
| 2013/0161494 A1 | 6/2013 | Sohn | |
| 2014/0239161 A1 | 8/2014 | Meynants et al. | |
| 2016/0088251 A1 | 3/2016 | Luo et al. | |
| 2018/0234652 A1 | 8/2018 | Sugawa et al. | |
| 2018/0332247 A1 | 11/2018 | Do et al. | |
| 2020/0312896 A1 | 10/2020 | Simony | |
| 2020/0382731 A1 | 12/2020 | Simony et al. | |

FOREIGN PATENT DOCUMENTS

| | | |
|---|---|---|
| CN | 205666884 U | 10/2016 |
| EP | 2 109 306 A2 | 10/2009 |
| WO | 2011/155442 A1 | 12/2011 |

OTHER PUBLICATIONS

U.S. Appl. No. 16/829,837, filed Mar. 25, 2020, Pixel and Method of Controlling the Same.

* cited by examiner

IMAGE SENSOR USING A GLOBAL SHUTTER AND METHOD FOR CONTROLLING SAME

BACKGROUND

Technical Field

The present disclosure relates generally to image sensors, and more particularly image sensors of the global shutter type.

Description of the Related Art

A global-shutter sensor comprises a pixel matrix, generally arranged in rows and columns. The pixels of a global-shutter sensor are commonly called global-shutter pixels.

In a global-shutter sensor, an integration phase during which an image is captured by the sensor is shared by all the pixels of the sensor, or in other words, is simultaneous for all the pixels of the sensor. More particularly, the integration phase begins by initializing, simultaneously for each pixel, a photo-sensitive area of the pixel. The integration phase ends when, simultaneously for each pixel, a voltage representative of the photogenerated charges accumulated, since the beginning of the integration phase, in the photosensitive area of the pixel is stored in the pixel. The voltages stored in the pixels of the sensor are next read sequentially, generally by simultaneously reading all of the pixels of the same row of the sensor, the rows being read one after the other.

BRIEF SUMMARY

There is a desire for a global-shutter image sensor, and a method for controlling such a sensor, addressing all or some of the drawbacks of known global-shutter image sensors and methods for controlling them.

One embodiment addresses all or some of the drawbacks of known global-shutter image sensors and methods for controlling them.

One embodiment provides an image sensor comprising a matrix of pixels each including:

a first transistor and a first switch that are connected in series between a first node configured to receive a first potential and an internal node of the pixel, a gate of the first transistor being coupled with a floating diffusion node of the pixel;

a capacitive element, a first terminal of which is connected to the floating diffusion node of the pixel; and several assemblies each comprising a capacitance connected in series with a second switch coupling the capacitance to the internal node of the pixel, the sensor further comprising a circuit configured to control, each time a voltage is stored in one of the assemblies of a pixel, an increase of a determined value of a difference in potential between the floating diffusion node and the internal node of the pixel.

According to one embodiment, to control said increase, the circuit is configured, during said storage, to control a switching, from a first level to a second level that is preferably lower than the first level, of a potential applied to a terminal of the capacitance of said assembly, said terminal being opposite the second switch of said assembly.

According to one embodiment, to control said increase, the circuit is configured, during said storage, to control a switching, from a third level to a fourth level that is preferably higher than the third level, of a potential applied to a second terminal of the capacitive element.

According to one embodiment, the circuit is configured, during said storage:

to control, after said increase, the interruption of a current circulating between the first node and the internal node of the pixel; and to separate, by a same first duration, the control of said increase, from the control of the interruption of the current, said first duration being identical irrespective of said pixel and said assembly of the pixel in which said storage is done.

According to one embodiment, in order to control said interruption of the current, the circuit is configured, during said storage, to:

control an opening of the first switch of the pixel; or control an opening of the second switch of said assembly.

According to one embodiment, in order to control said interruption of the current, the circuit is configured, during said storage, to:

control a switching, from the fourth level to the third level, of the potential applied to the second terminal of the capacitive element; or control an opening of the first switch of the pixel; or control an opening of the second switch of said assembly.

According to one embodiment, the circuit is configured, during said storage, to control a switching of the potential applied to the first node, from a fifth level to a sixth level that is preferably higher than the fifth level, before said increase.

According to one embodiment, the circuit is configured, during said storage, to separate, by a same second duration, the control of the interruption of the current from the control of the switching, from the fifth to the sixth level, of the potential applied to the first node, said second duration being identical irrespective of said pixel and said assembly of the pixel in which the storage is done.

According to one embodiment, the circuit is configured, during said storage, to:

maintain the sixth level of the potential applied to the first node, at least until the interruption of the current;

keep the first switch of the pixel and the second switch of said assembly closed, at least until the interruption of the current; and control an opening of the second switch of said assembly after the interruption of said current.

Another embodiment provides a method for controlling an image sensor comprising a matrix of pixels each including:

a first transistor and a first switch that are connected in series between a first node configured to receive a first potential and an internal node of the pixel, a gate of the first transistor being coupled with a floating diffusion node of the pixel;

a capacitive element, a first terminal of which is connected to the floating diffusion node of the pixel; and several assemblies each comprising a capacitance connected in series with a second switch coupling the capacitance to the internal node of the pixel, the method comprising storages of voltages in said several assemblies of said pixels, each storage in an assembly of a pixel comprising a control of an increase by a determined value of a difference in potential between the floating diffusion node and the internal node of the pixel.

According to one embodiment, the control of said increase comprises:

a control of a switching, from a first level to a second level that is preferably lower than the first level, of a potential applied to a terminal of the capacitance of said assembly, said terminal being opposite the second switch of said assembly; or a control of a switching, from a third level to a fourth level that is preferably higher than the third level, of a potential applied to a second terminal of the capacitive element.

According to one embodiment, said storage comprises, after said increase, a control of an interruption of a current circulating between the first node and the internal node of the pixel, a same first duration separating the control of said increase, from the control of the interruption of the current, irrespective of said pixel and said assembly of the pixel in which said storage is done.

According to one embodiment, said storage step comprises, before said increase, a control of a switching of the potential applied to the first node, from a fifth level, preferably low, to a sixth level, preferably high, preferably by separating, by a same second duration, the control of the interruption of the current from the control of the switching to the sixth level of the potential applied to the first node, said second duration being identical irrespective of said pixel and said assembly of the pixel in which the storage is done.

According to one embodiment, during said storage:

the potential applied to the first node is kept at the sixth level, at least until the interruption of the current;

the first switch of the pixel and the second switch of said assembly are kept closed at least until the interruption of the current; and the second switch of said assembly is opened after the interruption of the current.

According to one embodiment, a source of the first transistor is not connected to a constant-polarization current source.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, electronic devices in which a global-shutter image sensor can be provided have not been described, the described embodiments and modes of implementation being compatible with standard electronic devices comprising a global-shutter image sensor. Furthermore, the read circuits of a pixel have not been described in detail, the described embodiments and modes of implementation being compatible with the usual read circuits, in particular with the read circuits of a 4T pixel ("four-transistor" pixel).

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Figure 1:
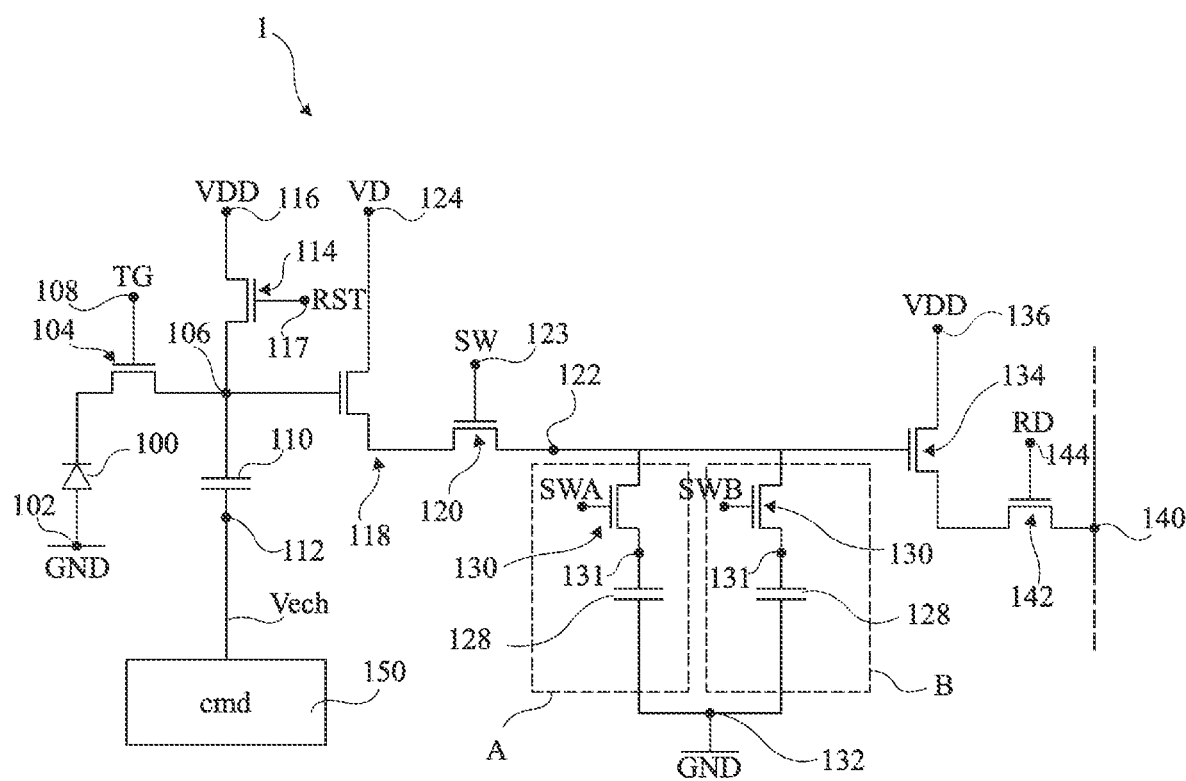
FIG. 1 shows an embodiment of a circuit of a pixel of a global-shutter sensor.

FIG. 1 shows an embodiment of a circuit of a pixel 1 of a global-shutter sensor.

The pixel 1 comprises a photosensitive area 100, also called photoconversion area 100, configured to accumulate charges photogenerated from the light that it receives, for example to accumulate electrons from photogenerated electron-hole pairs.

In this example, the photosensitive area 100 is a photodiode whereof one terminal, here the anode, is linked, preferably connected, to a node 102 for applying a reference potential such as the ground GND. Preferably, the photodiode is a so-called pinned photodiode.

A device 104 for transferring photogenerated charges accumulated in the area 100 toward a floating diffusion node 106 is connected between the area 100 and the node 106.

In the example of FIG. 1, the device 104 is a MOS transistor whereof conduction terminals (source and drain) are linked, preferably connected, respectively to the zone 100 and the node 106 and whereof the control terminal (gate) is connected to a node 108 for applying a control potential TG. More particularly, in the illustrated example where the area 100 is a pinned photodiode whereof the anode is connected to the ground GND, the transistor 104 has an N-channel and is connected between the cathode of the photodiode 100 and the node 106. Preferably, the transistor 104 constitutes a transfer gate between the photodiode 100 and the node 106, that is to say, a MOS transistor whereof the terminal on the side of the photodiode 100 is at least partially formed by a doped semiconductor region of the photodiode 100, here by the cathode of the photodiode 100.

A capacitive element 110 is connected between the node 106 and a node 112 for applying a potential.

In this embodiment, the node 112 receives a control signal or potential Vech.

The node 106 is connected to a node 116 for applying a potential, in this example a positive supply potential VDD of the pixel 1, by a switch 114. The switch 114 is controlled by a control potential RST. The switch 114 is for example a MOS transistor, in this example with N-channel, the conduction terminals of which are linked, preferably connected, to the respective nodes 106 and 116, and the control terminal of which is linked, preferably connected, to a node 117 for applying the potential RST.

The node 106 is further connected to the control terminal of a transistor 118, preferably a MOS transistor, and more particularly in this example, an N-channel MOS transistor.

The transistor 118 is connected in series with the switch 120, between an internal node 122 of the pixel 1 and a node 124 for applying a control potential VD. In practice, the signal or potential VD is supplied by a supply source, shared by all of the pixels of the sensor, for example by a voltage regulator.

The switch 120 is controlled by a control potential SW applied to a node 123 linked, preferably connected, to a control terminal of the switch 120. The switch 120 is for example a MOS transistor, in this example an N-channel transistor, the gate of which is connected to the node 123 for applying the potential SW.

In this embodiment, the switch 120 is connected between the node 122 and a conduction terminal of the transistor 118, namely the source of the transistor 118 in this example. More specifically, in this example, the conduction terminals of the transistor 120 are respectively connected to the node 122 and the source of the transistor 118.

In an embodiment variant that is not illustrated, the switch 120 is connected between the node 124 and a conduction terminal of the transistor 118, the other conduction terminal of the transistor 118 then being connected to the node 122.

The transistor 118 is mounted as a non-biased source follower. In other words, the source of the transistor 118 is not connected or linked to any source of a constant or substantially constant bias current.

The pixel 1 further comprises two assemblies A and B (in dotted lines in FIG. 1). The assemblies A and B are identical, with the exception of any manufacturing dispersions. Each assembly A, B is made up of a capacitance 128 in series with a switch 130. The assemblies A and B are connected to the node 122. The switch 130 of the assembly A, respectively B, is controlled by a control potential SWA, respectively SWB.

More particularly, in each of the assemblies A and B, the switch 130 links the capacitance 128 to the node 122. In other words, the switch 130 is connected between the node 122 and a node 131 for connecting the switch 130 to the capacitance 128, the capacitance 128 then being connected between the node 131 and a node 132 for applying a potential, the ground GND in this embodiment. Each of the assemblies A and B is therefore connected between the nodes 132 and 122.

Each switch 130 is for example a MOS transistor, in this example an N-channel transistor, the drain of which is connected to the node 122, the source of which is connected to the corresponding node 131, and the gate of which receives the corresponding potential SWA or SWB.

Preferably, the capacitances 128 of the assemblies A and B correspond to capacitive deep trench isolations (CDTI). As an example, a CDTI capacitance corresponds to a trench penetrating a semi-conductive region, the trench being filled with a conductive material isolated from the semi-conductive region by an isolating layer covering the walls and the bottom of the trench. The conductive material constitutes a first electrode of the capacitance, in this example linked to the node 132, and the semi-conductive region corresponds to a second electrode of the capacitance, in this example linked to the corresponding node 131. In the case where the capacitances 128 are CDTI capacitances, the potential of the node 132 is preferably negative.

As will be seen in more detail hereinafter, each assembly A, B is configured so that a voltage is stored therein, across the terminals of its capacitance 128. More particularly, each assembly A, B is configured to store a voltage representative of a state, that is to say, a potential level, of the node 106.

Providing two assemblies A, B makes it possible to store, in one of the assemblies A and B, a first voltage representative of an initial state of the node 106, at the beginning of an integration phase, and in the other of the assemblies A and B, a second voltage representative of a state of the node 106 at the end of the integration phase.

In the remainder of the description, a useful signal or differential of the pixel refers to the difference between the first and second voltages of a same integration phase. This useful signal is representative of the difference between the state of the node 106 at the beginning of the integration phase, and the state of the node at the end of the integration phase, that is to say, the quantity of light received by the area 100 of the pixel during this integration phase.

The node 122 is further connected to the gate of a MOS transistor 134, in this example an N-channel transistor. A conduction terminal of the transistor 134, in this example the drain, is connected to a node 136 for applying the supply potential VDD, the other conduction terminal of the transistor 134, in this example the source, being connected to an output node 140 of the pixel, and more specifically to a node or conductive rail 140, shared by all of the pixels of a same column of a pixel matrix of an image sensor.

In this embodiment, a switch 142 links a conduction terminal, here the source, of the transistor 134 to the node 140, the other conduction terminal of the transistor 134, here the drain, preferably being connected to the node 136. The switch 142 is controlled by a control potential RD applied to a node 144 linked, preferably connected, to a control terminal of the switch 142. The switch 142 is for example a MOS transistor, in this example an N-channel transistor, the conduction terminals of which are linked, preferably connected, respectively to the node 140 and to the source of the transistor 134, and the gate of which is connected to the node 144 for applying the potential RD.

In an embodiment variant that is not illustrated, one conduction terminal of the switch 142 is connected between the transistor 134 and the node 136.

Figure 1A:
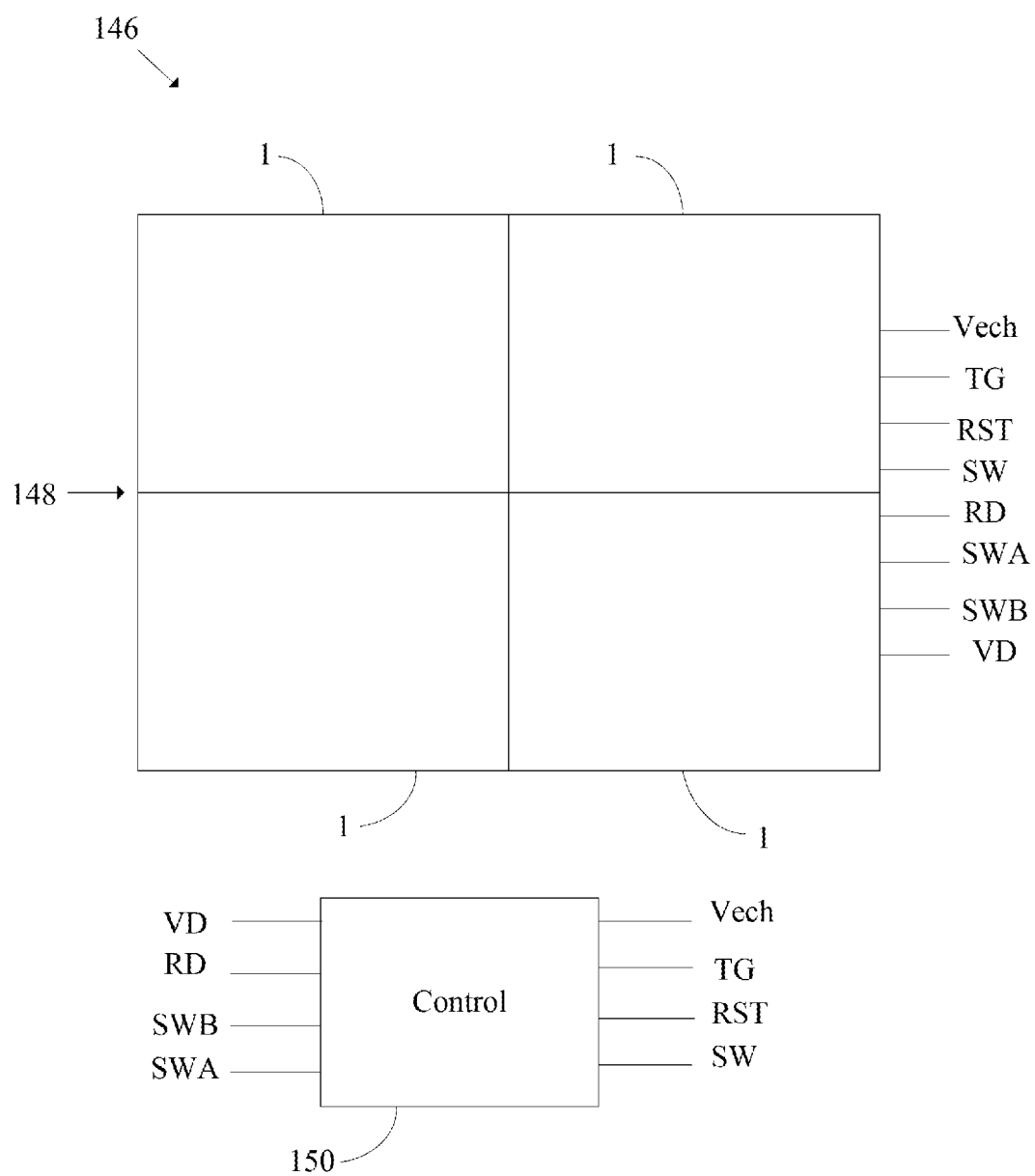
FIG. 1A is a block diagram of an image sensor include a matrix of pixels according to FIG. 1.

FIG. 1A is directed to an image sensor 146 that includes a matrix 148 of the pixels 1 and a control circuit 150 for controlling the matrix 148 of pixels 1.

In FIG. 1, the control circuit 150 (*cmd*) for controlling the pixel 1 is also shown. The circuit 150 is shared by all of the pixels 1 of the pixel matrix 148 of the sensor 146. The circuit 150 is configured to supply the potential Vech of each pixel 1. More generally, the circuit 150 is preferably configured to supply the signals, or potentials, Vech, RST, TG, SWA, SWB, VD, SW and RD for controlling the pixels 1 of the matrix 148. During operation, during each global operating phase comprising an integration phase, all of the pixels receive the same control signals, or in other words, all of the pixels are controlled in the same way. Then, between two successive global phases, during a reading phase of the voltages stored in the assemblies A and B of each pixel 1, the circuit 150 controls the rows of pixels 1 one after the other, by supplying the same control signals to all of the pixels of the row of pixels in the process of being read. In particular, the circuit 150 for example comprises a voltage regulator configured to supply the potential VD to all of the pixels 1 of the sensor.

Although this has not been illustrated here, the sensor 146 comprising the matrix 148 of pixels 1, further comprises one or several read circuits of the pixels. For example, the sensor comprises one read circuit per column of pixels 1, this read circuit then being linked, preferably connected, to the common rail or node 140 of all of the pixels of the column.

An operating mode of the sensor 146 comprising the matrix 148 of pixels 1 will now be described in connection with FIG. 2.

Figure 2:
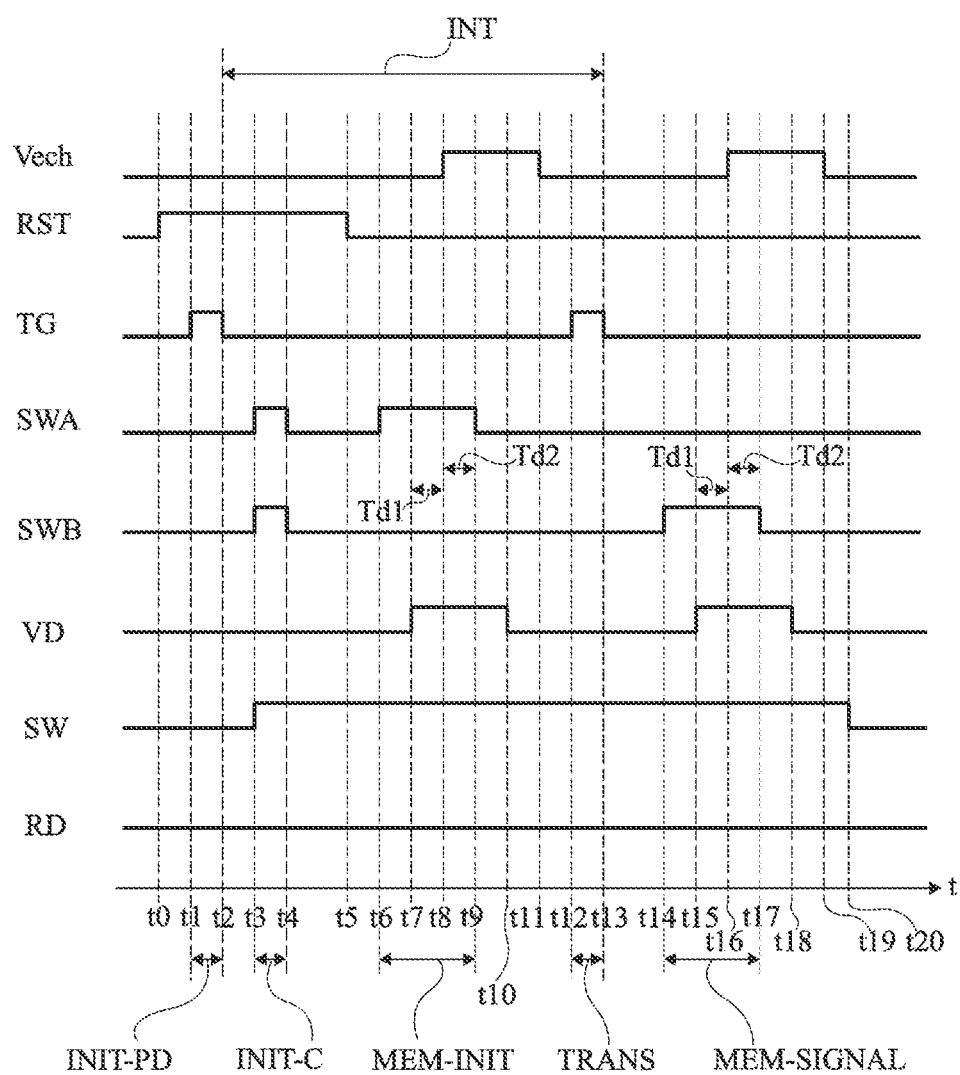
FIG. 2 shows timing diagrams illustrating an implementation mode of a control method of the pixel of FIG. 1.

FIG. 2 shows timing diagrams illustrating an implementation mode of a control method of the pixel 1 of FIG. 1. More particularly, FIG. 2 shows timing diagrams of the control signals Vech, RST, TG, SWA, SWB, VD, SW and RD of the pixel 1.

The signals Vech, RST, TG, SWA, SWB, VD, SW and RD are switched between low levels and high levels. It is considered here, as an example, that the signals Vech, RST, TG, SWA, SWB, VD, SW and RD are by default at their low levels, the transistor, or transfer gate, 104 then preventing the passage of charges from the area 100 to the node 106, and the switches 114, 120, 130 and 142 being open.

It will be noted that the potential corresponding to the low level of one of the signals RST, TG, SWA, SWB, VD, SW and RD can be different from the potential corresponding to the low level of another of these signals, and/or that the potential corresponding to the high level of one of these signals can be different from the potential corresponding to the high level of another of these signals.

Furthermore, a signal switched from a first level to a second level is kept at this second level as long as it is not indicated that the signal is switched from the second level to the first level.

Furthermore, when reference is made to the voltage of a node, it is considered, unless otherwise indicated, that this involves the voltage between this node and the ground GND.

At a moment t0, the switch 114 is switched from the open state to the closed state by controlling the switching of the potential RST from its low level to its high level. As a result, the voltage VDD at the node 116 finds itself at the node 106. This switching of the potential is done simultaneously for all of the pixels 1 of the sensor.

At the following moment t1, the transistor 104 is turned on by controlling the switching of the signal TG from its low level to its high level. In other words, the passage of photogenerated charges is authorized from the area 100 toward the node 106, via the transistor 104. This corresponds to a step INIT-PD for initializing the area 100, that is to say, the area 100 is emptied of photogenerated charges, here electrons, that could be located therein, these charges being discharged toward the node 106, then toward the node 116. This switching of the potential TG is done simultaneously for all of the pixels 1 of the sensor.

At the following moment t2, the transistor 104 is turned off by controlling the switching of the signal TG from its high level to its low level. This isolates the area 100 from the node 106, preventing photogenerated charges from going from the area 100 to the node 106. This switching from the on state to the off state of the transistor 104 marks the end of the step INIT-PD and the beginning of an integration period INT of the pixel 1 during which charges, here electrons, are photogenerated and accumulated in the area 100. This switching of the potential TG is done simultaneously for all of the pixels 1 of the sensor, as a result of which the integration phase INT begins simultaneously for all of the pixels 1 of the sensor.

At a following moment t3, the voltages across the terminals of the capacitances 128 are preferably initialized (step INIT-C). To that end, while the signal, or potential, VD is at its low level, the switches 120 and 130 are closed while controlling the switching of the signals SWA, SWB and SW from their low levels to their high levels. These switching operations can, in practice, not be simultaneous, unlike what is shown in FIG. 2. Because the signal VD is kept at its low level, the transistor 118 receives the potential VDD on its gate, and the switches 120 and 130 are closed, the low level of the signal VD is, for each capacitance 128, found on the corresponding node 131, thus determining an initialization voltage of the capacitances 128.

At a following moment t4 marking the end of step INIT-C, the switches 130 are open while controlling the switching of the signals SWA and SWB from their high levels to their low levels. As a result, the capacitances 128 are then electrically isolated from the node 122, and the voltage across the terminals of each capacitance 128, equal to the aforementioned initialization voltage, is then stored in each of the assemblies A and B.

The initialization phase INIT-C of the capacitances 128, in other words the control sequence described in relation with the moments t3 and t4, is carried out simultaneously for all of the pixels 1 of the sensors.

At the following moment t5, the switch 114 is turned off by controlling the switching of the signal RST from its high level to its low level. The node 106 is then isolated from the node 116. The potential present at the node 106 after the opening of the switch 114 is called initialization level, or reset level. This switching of the signal RST is done simultaneously for all of the pixels 1 of the sensor.

A voltage representative of the initialization level is next stored (step MEM-INIT) across the terminals of the capacitance 128 of one of the assemblies A and B, in this example the assembly A. The step MEM-INIT is done simultaneously for all of the pixels 1 of the sensor.

It is considered here that the step MEM-INIT begins, while the potential VD is at its low level, with the closing of the switch 130 of the assembly A, by controlling the switching of the signal SWA from its low level to its high level at a moment t6 following the moment t5.

From the moment t6 to a following moment t7, the switch 120 and the switch 130 of the assembly A being closed, the low level of the voltage VD finds itself on the capacitance 128 of the assembly A, on the corresponding node 131.

Then, at the moment t7, while the switch 120 is kept closed (SW at its high level), the switch 130 of the assembly B is kept open (signal SWB at its low level) and the potential Vech is at its low level, the voltage VD is switched from its low level to its high level, or, in other words, the signal VD is switched to its high level. This causes a current to circulate between the nodes 124 and 122, through the transistor 118.

The switching of the potential VD to its high level has the result that, from the moment t7, the transistor 118 is first in the ohmic state and the voltage across the terminals 128 of the assembly A increases with the potential VD, then the transistor 118 enters the saturation state and the voltage across the terminals of the capacitance 128 of the assembly A then has a value depending primarily on the potential at the node 106, here the initialization level. However, in the absence of constant current source on the transistor source 118, when the transistor 118 is in the saturated state, the voltage across the terminals of the capacitance 128 converges asymptotically toward a voltage depending on the potential of the node 106 and the threshold voltage of the transistor 118. The voltage across the terminals of the capacitance 128 therefore also depends on the time elapsed since the switching of the potential VD to its high state.

To be freed from the effect of this temporal dependence, one may think to block the variations of the voltage across the terminals of the capacitance 128 of the assembly A by interrupting, at the following moment t8, the circulation of the current between the nodes 122 and 124, after a given duration Td1 has elapsed since the switching of the signal VD to its high level.

However, the voltage across the terminals of the capacitance 128 just before the moment t8, that is to say, just before the moment t7+Td1, would then also depend on variations of the current having circulated in the transistor 118 since the moment t7. Such current variations are poorly controlled and in particular linked to the magnitude of the difference between the potential of the node 106 and that of the node 122 at the moment where the potential VD is switched to its high level. Furthermore, because the potential VD is supplied simultaneously with all of the pixels of the sensor by the circuit 150, for example by a voltage regulator of the circuit 150, these poorly controlled variations of the current are also linked to the current called by each pixel 1 of the sensor since the moment t7, that is to say, linked to the environment of the considered pixel 1. As a result, the voltage stored in the capacitance 128 at the moment t8, instead of only depending on the level of the potential of the node 106 before the intensity t7 and the duration Td1, would also depend on the environment of the pixel 1 and the magnitude of the difference between the potential of the node 106 and that of the node 122 at the moment where the potential VD is switched to its high level, which is problematic.

To address this problem, at the moment t8, the inventors provide for increasing, by a determined value, the difference in potential between the node 106 and the node 122, so as to cause the circulation, between the nodes 122 and 124, of a controlled circuit whose value is determined by the value of the increase in the difference in potential between the node 106 and the node 122. The current that circulates in the transistor 118 just before the moment t8 is weak, typically in the order of about one hundred pico-amperes or less, and depends on the surroundings of the pixel 1 as well as the difference in potential between the nodes 106 and 122 at the moment t7.

Thus, after the moment t8, one may consider that the gate/source voltage Vgs of the transistor 118, therefore the voltage of the node 131, depends solely on the value of the increase (at the moment t8) of the difference in potential between the node 106 and the node 122, the potential of the node 106 before the beginning of step MEM-INIT, and a given duration Td2 elapsed since the moment t8. The dependence of the voltage at the node 131 on the duration Td2 results from the fact that, as previously described, in the absence of constant current source on the transistor source 118, when the transistor 118 is in the saturated state, the voltage across the terminals of the capacitance 128 converges asymptotically toward a voltage depending on the potential of the node 106 and the threshold voltage of the transistor 118.

At a moment t9 equal to the moment t8+Td2, the current circulating between the nodes 122 and 124, therefore in the transistor 118, is interrupted to block or sample the value of the voltage across the terminals of the capacitance 128 of the assembly A.

By providing that, for each assembly A and B, the storage is implemented by applying the same increase in the difference in potential between the nodes 106 and 122 before interrupting, after a same duration Td2, the current circulating in the transistor 118, the pixel offset is reduced, or even eliminated.

Providing, for each storage in each of the assemblies A and B, a same increase in potential between the nodes 106 and 122 and a same duration Td2, makes it possible to relax the constraints on the duration Td1 separating the moments t7 and t8, which can then be different depending on the assembly A or B in which the storage is done. However, in order for the value of the voltage stored in each of the assemblies A and B to be as deterministic as possible, it is preferable for this duration Td1 to be the same for each assembly A and B.

In the embodiment described in relation with FIGS. 1 and 2, at the moment t8, the increase in the difference in potential between the nodes 106 and 122 is implemented by controlling a switch of the signal Vech from its low level to its high level. As an example, the difference between the high and low levels of the signal Vech is such that the switching of the signal Vech to its high level causes an increase of between 200 and 300 mV, for example in the order of 250 mV, in the difference in potential between the nodes 106 and 122.

Furthermore, in the embodiment of FIG. 2, at the moment t9, the value of the voltage across the terminals of the capacitance 128 of the assembly A is blocked by the opening of the switch 130 of the assembly A, controlled by switching the signal SWA from its high level to its low level.

The opening of the switch 130 of the assembly A further makes it possible to isolate the capacitance 128 from the node 122, therefore to store the voltage present across the terminals of the capacitance 128 of the assembly A. The opening of the switch 130 of the assembly A marks the end of the step MEM-INIT.

The step MEM-INIT described hereinabove makes it possible to control, that is to say, to make as deterministic as possible, the current circulating between the nodes 122 and 124 at the moment where the voltage across the terminals of the capacitance 128 is stored, therefore to control the value of the stored voltage. If one had stored, between the moments t7 and t8, the voltage across the terminals of the capacitance 128, that is to say, without determined increase of the voltage Vsg of the transistor 118 at the moment t8, the current circulating between the nodes 122 and 124 at the moment of this storage would not have been as well controlled, which would have led to unwanted variations on the value of the stored voltage.

The method continues by controlling the switching of the signals VD and Vech to their low levels, for example at the successive respective moments t10 and t11, after the moment t9. The order in which the signals VD and Vech are switched to their low levels can be reversed.

At a following moment t12, the transistor 104 is switched to the on state by controlling the switching of the signal TG to its high level. At a following moment t13, the transistor 104 is turned off by controlling the switching of the signal TG to its low level. Thus, between the moments t12 and t13, the photogenerated and accumulated charges, in the area 100 from the moment t2 to the moment t13, are transferred to the node 106 (step TRANS), due to the fact that the signal TG is at its high level and the electric potential of the node 106 is higher than that of the cathode of the photodiode 100. The potential of the node 106 then decreases by a value determined by the number of transferred charges. The potential of the node 106 after switching of the transistor 104 to the off state is called signal level and is representative of the number of charges photogenerated and accumulated in the area 100 between the moments t2 and t13. In other words, the state of the node 106 after the moment t13 is representative of the quantity of light received by the area 100 between these moments t2 and t13. The step TRANS is done simultaneously for all of the pixels of the sensor 1. The moment t13 marks the end of the integration period INT shared by all of the pixels of the sensor.

The global operating phase of the sensor then continues with the storage (step MEM-SIGNAL) of a voltage representative of the signal level of the node 106. More particularly, this voltage is stored across the terminals of the capacitance 128 of the assembly A or B that has not yet been used to store a potential level of the node 106 during step MEM-INIT, that is to say, across the terminals of the capacitance 128 of the assembly B in this example. The step MEM-SIGNAL is done simultaneously for all of the pixels of the sensor.

To that end, from a following moment T14, the control sequence described in connection with the successive moments t6, t7, t8 and t9 is repeated at successive moments t14, t15, t16 and t17, respectively, with the difference that, instead of switching the signal SWA at the moments t6 and t9, it is the signal SWB that is switched, similarly to the signal SWA, at the respective moments t14 and t17. The moment t17 marks the end of the step MEM-SIGNAL. During the step MEM-SIGNAL, as previously indicated, the increase of the difference in potential between the nodes 106 and 122, and the duration Td2 have the same values as in the step MEM-INIT.

Preferably, during the MEM-SIGNAL step, the moments t15 and t16 are separated from one another by the same duration Td1 as that separating the moments t7 and t8.

In this example, the method continues by switching, simultaneously for all of the pixels of the sensor, the signals VD and Vech to their low levels, for example at the respective successive moments t18 and t19 after the moment t17. The order in which the signals VD and Vech are switched to their low levels can be reversed.

At a following moment t20, the switch 120 is switched to the off state by controlling the switching of the signal SW from its high level to its low level. This makes it possible to isolate the node 122 from the transistor 118, therefore from the node 124. This makes it possible to avoid any alteration, by the transistor 118, of the voltages stored across the terminals of the capacitances 128. This switching is preferably simultaneous for the pixels of the sensor. Thus, in this example, the moment t20 marks the end of the global operating phase of the sensor, or global acquisition and storage phase of an image by the sensor.

The pixels 1 are next read. The reading of the pixels 1 is done line by line, that is to say, one line of pixels 1 after another. When a line of pixels 1 is in the process of being read, all of the pixels 1 of the line receive the same control signals, such that all of the pixels of the line are read at the same time.

The phase for reading the voltage stored across the terminals of the capacitance of one of the assemblies A and B consists, while the switch 120 is kept open to isolate the node 122 from the node 124, of closing the switch 130 of this assembly and the switch 142, in order to obtain, on the node 140, a potential representative of this stored voltage. A reading phase is carried out for one of the assemblies A and B, then a reading phase is carried out for the other of these assemblies A and B.

Preferably, before each reading phase of an assembly, the potential of the node 122 is placed at a determined value, by closing, then reopening the switch 120 while the potential VD is kept at its low level.

Once all of the pixels of the sensor have been read, a new global acquisition and storage phase of an image, as described in relation with the moments t1 to t20, can be implemented. The difference between the high and low levels of the signal Vech, the difference between the high and low levels of the signal VD, the duration Td2, and preferably, the duration Td1 have identical respective values irrespective of the considered pixel and/or irrespective of the considered assembly A or B during the implementation of the steps MEM-INIT and MEM-SIGNAL.

Because the useful signal of the pixel 1 corresponds to a difference between a voltage representative of an initialization level of the node 106, and a voltage representative of a signal level of the node 106, this makes it possible to correct the offset of the pixel. Providing two voltages in order to define the useful signal of the pixel corresponds to a correlated double sampling. The pixel 1 is therefore compatible with existing read circuits implementing a correlated double sampling. In particular, according to the read circuit used to read the pixel 1, one may choose to adapt the order in which the assemblies A and B are read.

In the method described above, during each storage step MEM-INIT, the interruption of the current circulating between the nodes 122 and 124 in order to block the value of the voltage across the terminals of the capacitance 128 of the assembly A results from the switching of the signal SWA to its low level. Furthermore, during each storage step MEM-SIGNAL, the interruption of the current circulating between the nodes 122 and 124 in order to block the value of the voltage across the terminals of the capacitance 128 of the assembly B results from the switching of the signal SWB to its low level. The use of two different signals SWA and SWB can lead to the introduction of a shift in the useful signal of the pixel, for example due to the fact that the propagation times of the signals SWA and SWB and/or the edges of the signals SWA and SWB and/or the threshold voltages of the corresponding transistors 130 can, in practice, be different. This may in particular lead to a different duration Td2 according to the considered assembly A or B, and therefore a shift in the useful signal.

In variants of a control method of the pixel 1, it is therefore provided, during each step MEM-INIT and during each step MEM-SIGNAL, to interrupt the current circulating between the nodes 124 and 122 using the same signal for these two steps.

In a first embodiment variant of the method described in relation with FIG. 2, it is provided to interrupt the circulation of the current between the nodes 122 and 124 using the signal SW.

Figure 3:
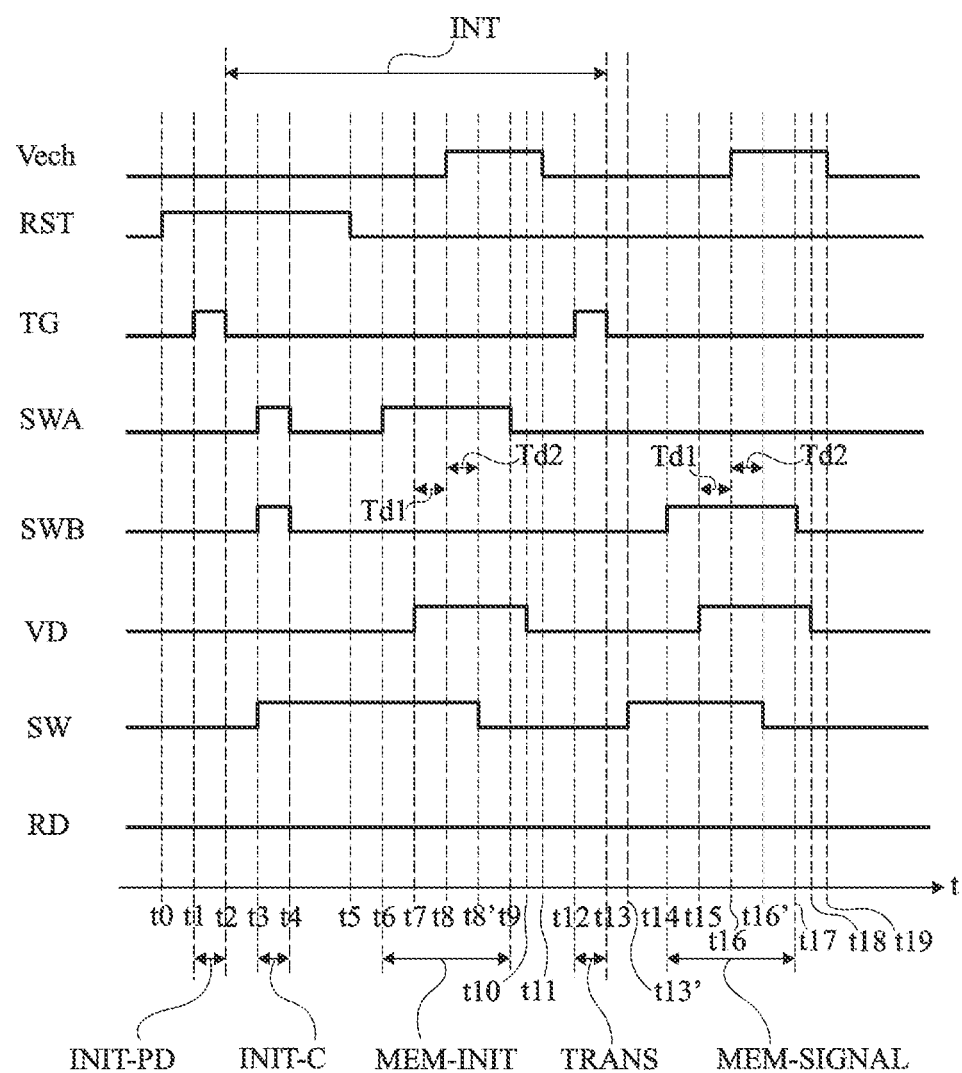
FIG. 3 shows timing diagrams illustrating an implementation variant of a control method of the pixel of FIG. 1.

FIG. 3 shows timing diagrams illustrating this first embodiment variant. Only the differences between the timing diagrams of FIG. 2 and those of FIG. 3 are described in detail here.

In FIG. 3, between the moments t8 and t9, at a moment t8' equal to t8+Td2, the current circulating between the nodes 122 and 124 is interrupted by the opening of the switch SW, by controlling a switching of the signal SW to its low level. This interruption of the current makes it possible to block or sample the value of the voltage across the terminals of the capacitance 128 of the assembly A.

Then, in a manner similar to what was described in relation with FIG. 2, at the moment t9, the switch 130 of the assembly A is opened by controlling the switching of the signal SWA to its low level, so as to store, in the assembly A, the voltage across the terminals of the capacitance 128 of this assembly. The moment t9 marks the end of the storage step MEM-INIT.

In FIG. 3, before the implementation of the step MEM-SIGNAL, in addition to switching the signals VD and Vech to their low levels, for example at the respective moments t10 and t11, the circuit 150 also closes the switch 120 by controlling a switching of the signal SW to its high level, in this example at a moment t13' comprised between the moments t13 and t14.

In FIG. 3, between the moments t16 and t17, at a moment t16' equal to t16+Td2, the current circulating between the nodes 122 and 124 is interrupted by the opening of the switch SW, by controlling a switching of the signal SW to its low level. This interruption of the current makes it possible to block or sample the value of the voltage across the terminals of the capacitance 128 of the assembly B.

Then, in a manner similar to what was described in relation with FIG. 2, at the moment t17, the switch 130 of the assembly B is opened by controlling the switching of the signal SWB to its low level, so as to store, in the assembly B, the voltage across the terminals of the capacitance 128 of this assembly. The moment t17 marks the end of the storage step MEM-SIGNAL.

In this example, like in FIG. 2, the method continues by switching the signals VD and Vech to their low levels, for example at the respective moments t18 and t19. In this example, the moment t19 marks the end of the global acquisition and storage phase of an image. The voltages stored in the pixel are next read, similarly to what was described in relation with FIG. 2.

In a second embodiment variant of the method described in relation with FIG. 2, it is provided to interrupt the circulation of the current between the nodes 122 and 124 directly using the signal Vech.

Figure 4:
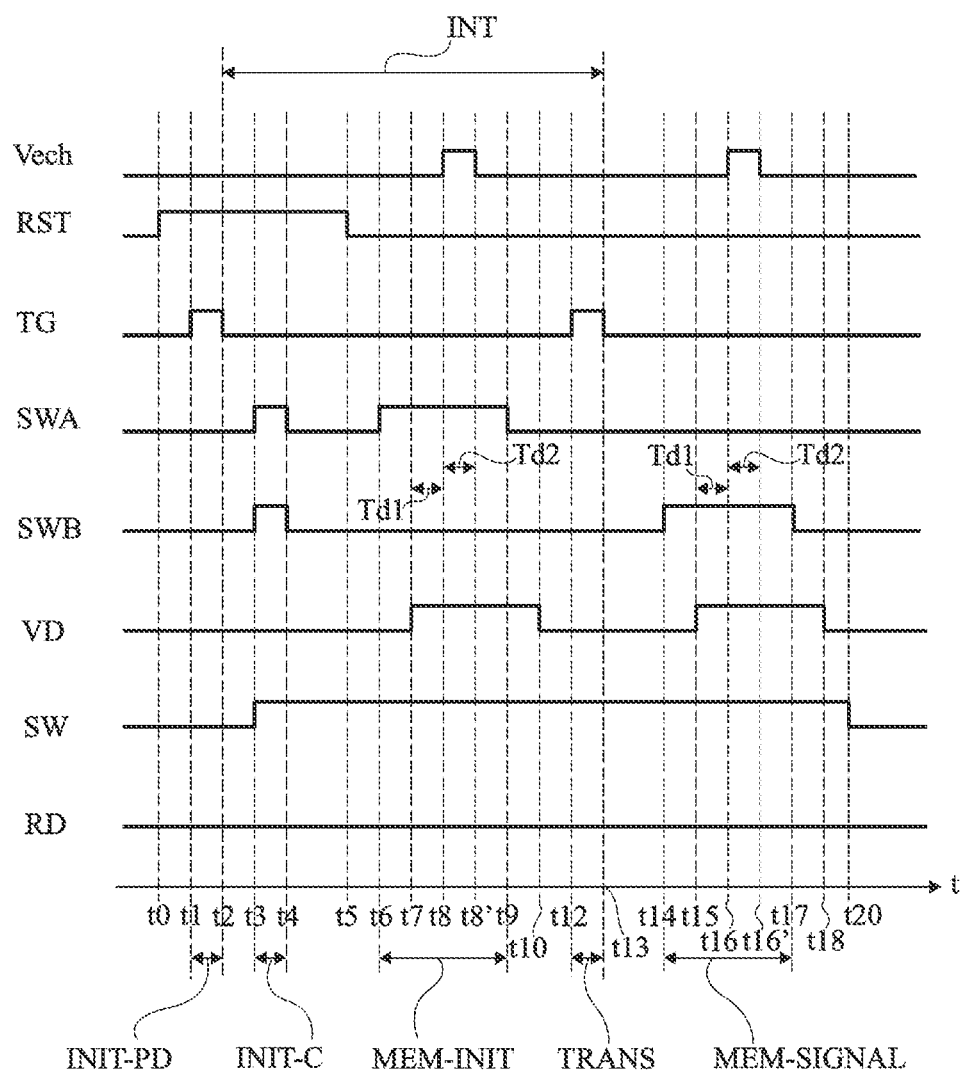
FIG. 4 shows timing diagrams illustrating another implementation variant of a control method of the pixel of FIG. 1.

FIG. 4 shows timing diagrams illustrating this second embodiment variant. Only the differences between the timing diagrams of FIG. 2 and those of FIG. 4 are described in detail here.

In FIG. 4, between the moments t8 and t9, at a moment t8' equal to t8+Td2, the current circulating between the nodes 122 and 124 is interrupted by controlling a switching of the signal Vech to its low level, which makes it possible to block or sample the value of the voltage across the terminals of the capacitance 128 of the assembly A. Indeed, the decrease in the level of the potential Vech at the moment t8' causes a decrease in the potential of the node 106, therefore of the voltage Vgs, which is reflected by a decrease, for example by at least a factor 10, preferably by at least a factor 100, or even at least a factor 1000, of the current circulating in the transistor. Thus, the current circulating after this switching of the signal Vech is considered to be negligible or nil, or in other words, it is considered that the current in the transistor 118 is interrupted by this switching of the signal Vech.

One skilled in the art is able to choose the value of the difference between the high and low levels of the signal Vech to obtain the operation described above. As an example, the high and low levels of the potential Vech are such that the decrease of the potential of the node 106 is in the order of 200 mV or more.

In a manner similar to what was described in relation with FIG. 2, at the moment t9, the switch 130 of the assembly A is opened by controlling the switching of the signal SWA to its low level, so as to store, in the assembly A, the voltage across the terminals of the capacitance 128 of this assembly. The moment t9 marks the end of the storage step MEM-INIT.

Before the implementation of the step MEM-SIGNAL, as was described in relation with FIG. 2, the potential VD is switched to its low level, for example at the moment t10.

Furthermore, because the signal Vech was switched to its low level at the moment t8', relative to the method described in relation with FIG. 2, the moment t11 is omitted and the method continues directly to the moment t12.

In FIG. 4, between the moments t16 and t17, at a moment t16' equal to t16+Td2, the current circulating between the nodes 122 and 124 is interrupted, by controlling a switching of the signal Vech to its low level, as was described for the step MEM-INIT of FIG. 4. This makes it possible to block or sample the value of the voltage across the terminals of the capacitance 128 of the assembly B.

In a manner similar to what was described in relation with FIG. 2, at the moment t17, the switch 130 of the assembly B is opened by controlling the switching of the signal SWB to its low level, so as to store, in the assembly B, the voltage across the terminals of the capacitance 128 of this assembly. The moment t17 marks the end of the storage step MEM-SIGNAL.

In this example, like in FIG. 2, the method continues by switching the potential VD to its low level, for example at the moment t18.

Furthermore, because the potential Vech was switched to its low level at the moment t16', relative to the method described in relation with FIG. 2, the moment t19 is omitted and the method continues directly to the moment t20. In this example, the moment t20 marks the end of the global acquisition and storage phase of an image. The voltages stored in the pixel are next read, similarly to what was described in relation with FIG. 2.

One advantage of this embodiment variant is that the duration Td2 of the steps MEM-INIT and MEM-SIGNAL corresponds to the duration separating two switchings of a single signal Vech, which makes it possible to control this duration Td2 with greater precision than when it corresponds to the duration separating the switching of a first signal from the switching of a second signal different from the first.

In relation with FIGS. 1 to 4, a pixel 1 has been disclosed as well as methods for controlling this pixel in which the increase in the difference in potential between the nodes 106 and 122, in order for a current of controlled value to circulate between the nodes 122 and 124, results from an increase in the level of the potential Vech supplied to the node 112.

In another embodiment, it is provided that this increase in the difference in potential between the nodes 106 and 122 results from a decrease in the level of a potential Vech' supplied by the circuit 150 and applied to the node 132.

This other embodiment will be described hereinafter in relation to FIGS. 5 to 7.

Figure 5:
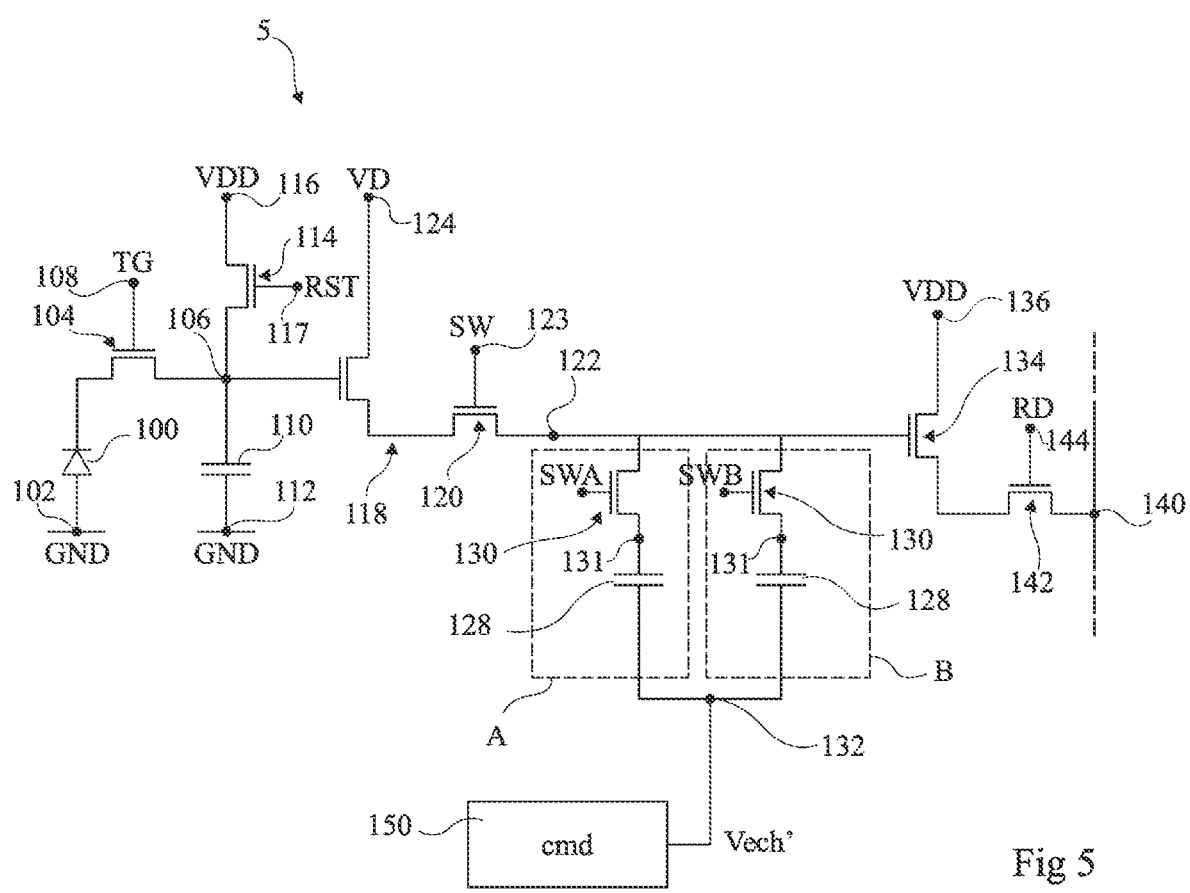
FIG. 5 shows another embodiment of a circuit of a pixel of a global-shutter sensor.

FIG. 5 shows another embodiment of a circuit of a pixel 5 of a global-shutter sensor. The pixel 5 is similar to the pixel 1, and only the differences between these two pixels are described in detail here.

More particularly, the pixel 5 differs from the pixel 1 in that:
the potential Vech' is applied to the node 132; and
in this embodiment, a reference potential, for example the ground, is applied to the node 112.

Furthermore, relative to the control circuit 150 described in relation with FIGS. 1 to 4, in this embodiment, the control circuit 150 of the pixels 5 of the sensor is configured to supply the potential Vech' and does not supply the potential Vech.

Figure 6:
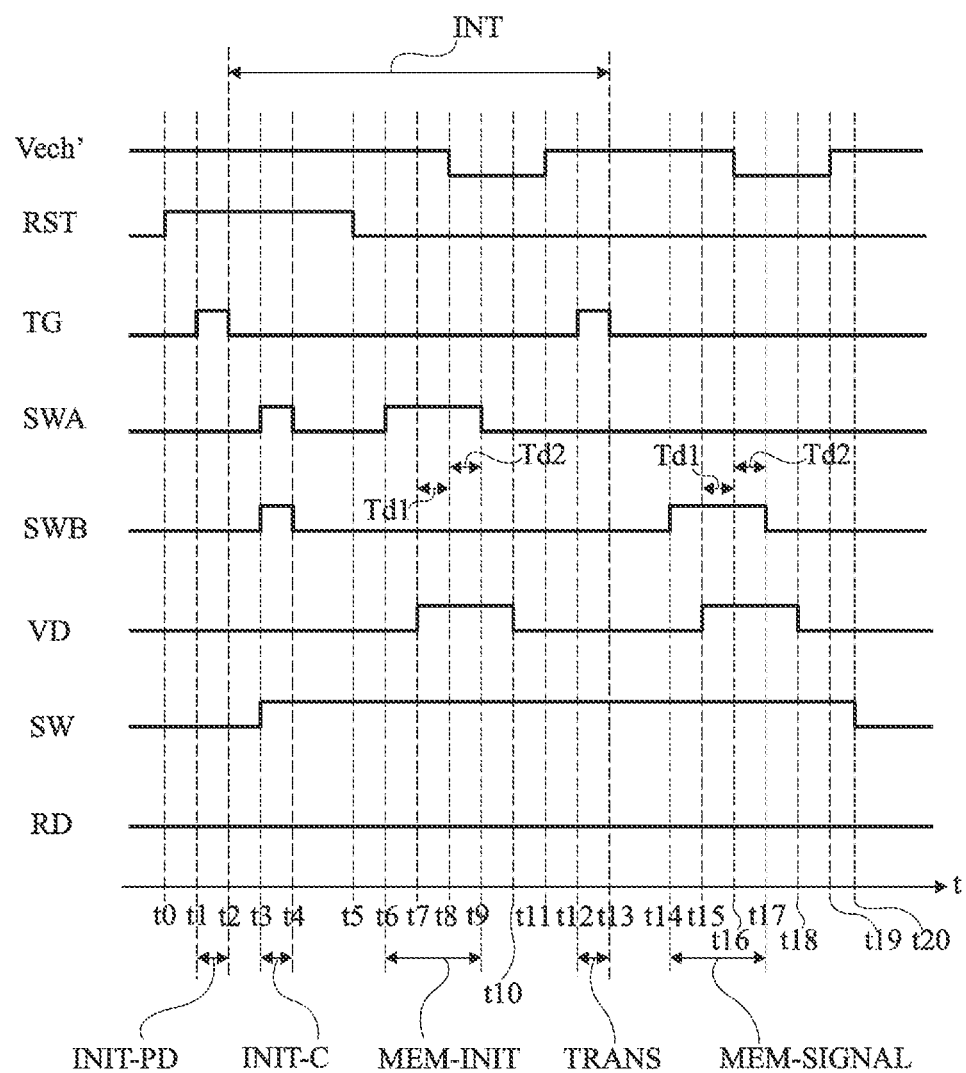
FIG. 6 shows timing diagrams illustrating an implementation mode of a control method of the pixel of FIG. 5.

FIG. 6 shows timing diagrams illustrating an implementation mode of a control method of the pixel of FIG. 5. Only the differences between the timing diagrams of FIG. 2 and those of FIG. 6 are described in detail here.

In particular, relative to FIG. 2, in FIG. 6, the timing diagram of the potential Vech is omitted and the timing diagram of the potential Vech' is added. The potential or signal Vech' can assume a high level and a low level. As an example, it is considered that the signal Vech' is, by default, at its high level.

In FIG. 6, at the moment t8, the circuit 150 controls a switching of the potential Vech' to its low level. This results in a corresponding decrease of the potential of the node 122, therefore an increase by a determined value of the difference in potential between the nodes 106 and 122. This allows the current of controlled value described in relation with FIGS. 2 to 4, to circulate between the nodes 122 and 124. As an example, the difference between the high and low levels of the signal Vech' is such that the switching of the signal Vech' to its low level causes an increase of between 200 and 300 mV, for example in the order of 250 mV, in the difference in potential between the nodes 106 and 122.

In this embodiment, like in the embodiment of FIG. 2, at the following moment t9, the opening of the switch 130 of the assembly A makes it possible to interrupt the circulation of the current between the nodes 122 and 124, therefore to block or sample the value of the voltage present across the terminals of the capacitance 128 of the assembly A.

Furthermore, the opening of this switch makes it possible to isolate the capacitance 128 of the node 122, therefore to store, in the assembly A, the voltage present across the terminals of the capacitance 128 at the time of the interruption of the current between the nodes 122 and 124. The moment t9 marks the end of the step MEM-INIT.

At the moment t11, the circuit 150 controls a switching of the potential Vech' to its high level.

At the moment t16, the circuit 150 controls a switching of the potential Vech' to its low level so that the current of controlled value circulates between the nodes 122 and 124.

In this embodiment, like in the embodiment of FIG. 2, at the following moment t17, the opening of the switch 130 of the assembly B makes it possible to interrupt the circulation of the current between the nodes 122 and 124, therefore to block or sample the value of the voltage present across the terminals of the capacitance 128 of the assembly B.

Furthermore, the opening of this switch makes it possible to isolate the capacitance 128 of the node 122, therefore to store, in the assembly B, the voltage present across the terminals of the capacitance 128 at the time of the interruption of the current between the nodes 122 and 124. The moment t17 marks the end of the step MEM-SIGNAL.

In this example, at the moment t19, the circuit 150 controls a switching of the potential Vech' to its high level.

In this example, the moment t20 marks the end of the global acquisition and storage phase of an image by the sensor. The voltages stored in the pixel are next read, similarly to what was described in relation with FIG. 2.

Relative to the methods described in relation with FIGS. 2 to 4, the method described in relation with FIG. 6 can be more energy-consuming due to the fact that the value of the capacitances 128 is generally greater than that of the capacitive element 110.

In the embodiment of FIG. 6, the interruption of the current circulating between the nodes 122 and 124 is implemented identically to what was described in relation with FIG. 2, that is to say, for example with the signal SWA during steps MEM-INIT and with the signal SWB during steps SWB. The same problems as those described in relation with FIG. 2 can then arise.

It is then provided to adapt the embodiment variant described in relation with FIG. 3, to the method described in relation with FIG. 6.

Figure 7:
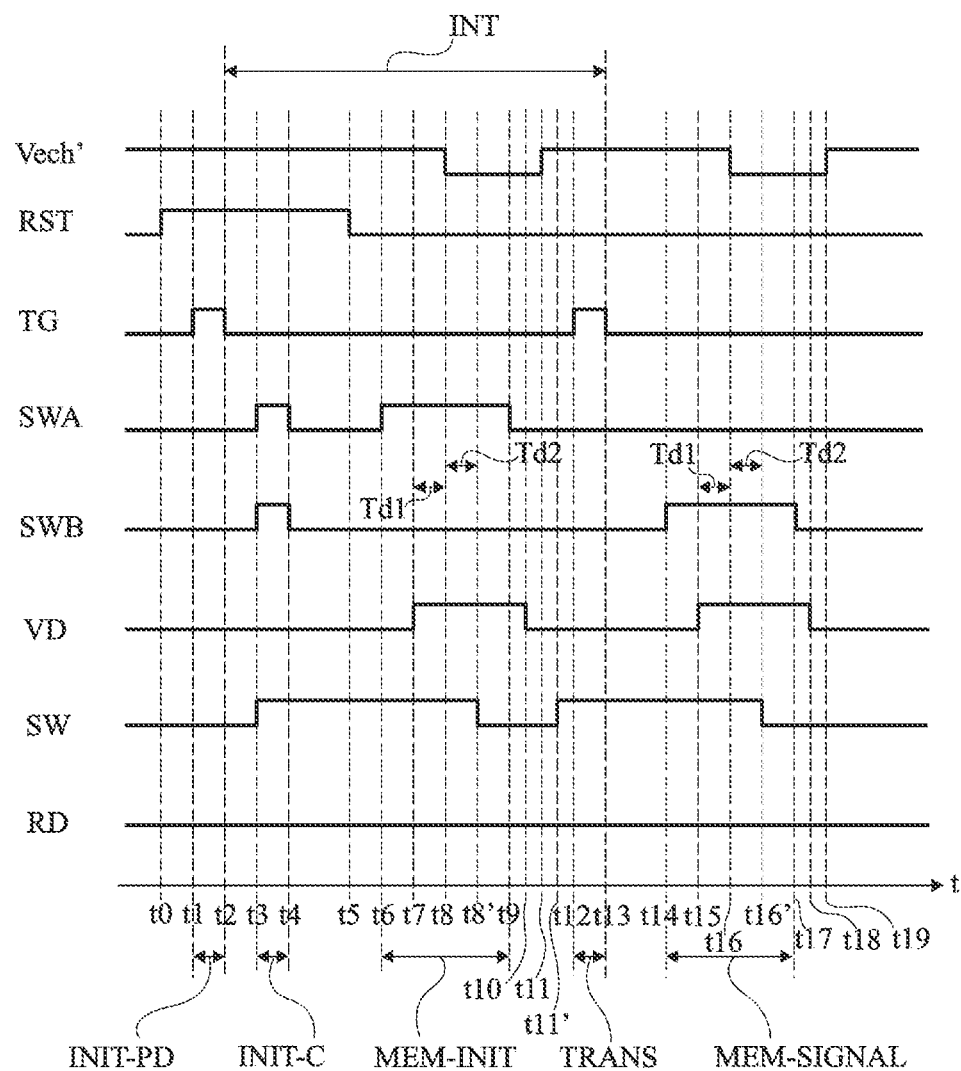
FIG. 7 shows timing diagrams illustrating an implementation variant of a control method of the pixel of FIG. 5.

FIG. 7 shows timing diagrams illustrating the application, to the method of FIG. 6, of the variant described in relation with FIG. 3. Only the differences between the timing diagrams of FIG. 6 and those of FIG. 7 are described in detail.

In FIG. 7, between the moments t8 and t9, at a moment t8' equal to t8+Td2, the current circulating between the nodes 122 and 124 is interrupted by the opening of the switch SW, by controlling a switching of the signal SW to its low level. This interruption of the current makes it possible to block or sample the value of the voltage across the terminals of the capacitance 128 of the assembly A.

In a manner similar to what was described in relation with FIG. 6, at the moment t9, the switch 130 of the assembly A is opened by controlling the switching of the signal SWA to its low level, so as to store, in the assembly A, the voltage across the terminals of the capacitance 128 of this assembly. The moment t9 marks the end of the storage step MEM-INIT.

In FIG. 7, before the implementation of the step MEM-SIGNAL, in addition to switching the signal VD to its low level (moment t10) and the signal Vech' to its high level (moment t11), the circuit 150 also controls a switching of the signal SW to its high level, in this example at a moment t11' comprised between the moments t11 and t12.

In FIG. 7, between the moments t16 and t17, at a moment t16' equal to t16+Td2, the current circulating between the nodes 122 and 124 is interrupted by the opening of the switch SW, by controlling a switching of the signal SW to its low level. This interruption of the current makes it possible to block the value of the voltage across the terminals of the capacitance 128 of the assembly B.

In a manner similar to what was described in relation with FIG. 6, at the moment t17, the switch 130 of the assembly B is opened by controlling the switching of the signal SWB to its low level, so as to store, in the assembly B, the voltage across the terminals of the capacitance 128 of this assembly. The moment t17 marks the end of the storage step MEM-SIGNAL.

In this example, like in FIG. 6, the method continues by switching the signal VD to its low level (moment t18) and the signal Vech' to its high level (moment t19).

In this example, after the step MEM-SIGNAL, the signal SW is left at its low level. Thus, in this example, the moment t19 marks the end of the global operating phase of the sensor, or global acquisition and storage phase of an image by the sensor. The voltages stored in the pixel are next read, similarly to what was described in relation with FIG. 2.

Pixels 1 and 5 have been described comprising a capacitive element 110 connected between nodes 106 and 112. In practice, one or several intrinsic capacitances can be connected to the node 106, and form a capacitive divider bridge with the element 110. In the pixel 1, the person skilled in the art is then able to determine, in particular as a function of the intrinsic capacitances of the node 106, the value of the capacitive element and the magnitude of the difference in potential between the high and low levels of the signal Vech that allow the operation described in relation with FIG. 2, 3, 4.

In the pixel 5, the capacitive element 110 can correspond only to the intrinsic capacitances of the node 106.

In other embodiment variants that are not illustrated, it is provided that the pixel 1 or 5 comprises more than two assemblies A and B with a capacitance 128 in series with the switch 130 linking the capacitance 128 to the node 122. Each additional assembly is then connected between the nodes 122 and 132, in a manner similar to the assemblies A and B. The switch 130 of each additional assembly is then preferably controlled by a signal SWK specific to that assembly.

Each additional assembly makes it possible to store an additional voltage representative of a potential or state of the node 106. This for example makes it possible to store a first signal level after a first integration duration, for example in the assembly B as was previously described, and a second signal level corresponding to a longer integration duration in an additional assembly 128, 130. Providing several integration durations for a same global integration phase makes it possible to select, once they have been read, the first or second signal level as a function of the light received during the integration phase, for example to produce a high dynamic range (HDR) sensor.

Those skilled in the art are able to adapt the embodiments, modes of implementation and variants described above to the case of pixels 1 or 5 comprising more than two assemblies A and B of a capacitance 128 and a switch 130. In particular, the identical signal switching sequence making it possible to store a voltage in any one of the assemblies A and B is implemented to store a voltage in each additional assembly, the duration Td2 and, preferably, the duration Td1, being identical irrespective of the assembly in which this voltage is stored, and irrespective of the considered pixel. Furthermore, each voltage stored in an additional assembly is read during a reading phase identical to that described for each of the assemblies A and B, optionally by providing for placing the node 122 at a determined value before this reading phase.

Various embodiments and variants have been described. Those skilled in the art will understand that certain features of these embodiments can be combined and other variants will readily occur to those skilled in the art. In particular, those skilled in the art are able to adapt the described control methods to the case of a pixel 1 in which a potential different from the ground GND is applied to the node 132, the voltage across the terminals of each capacitance 128 and the voltage at the node 122 then being referenced relative to this potential.

Furthermore, those skilled in the art are able to adapt the embodiments, modes of implementation and variants that have been described to the case where the charges accumulated in the area 100 and transferred to the node 106 are holes rather than electrons, in particular by adapting the supply potential, the type (N or P channel) of the MOS transistors and/or the high and low levels of the control signals.

Furthermore, those skilled in the art are able to adapt the embodiments, modes of implementation and variants that have been described to the case where the MOS transistors are replaced by transistors of other technologies and/or to the case where all or some of the switches of the pixels 1 and 5 are implemented differently than by MOS transistors.

Furthermore, in alternative embodiments (not illustrated), the device 104 of the pixel 1 of FIG. 1 or of the pixel 5 of FIG. 5 may be omitted, particularly in case of a pulsed illumination of the image sensor. In such embodiments, the cathode of the photodiode 100 is for example connected directly to the floating diffusion node 106. A global illumination pulse of the image sensor for example occurs between the storage of the initialization level and the storage of the signal level at the node 106, meaning that kT/C noise can be cancelled, despite the removal of the transfer gate 104. By removing the transfer gate 104, the pixel circuit will be thus smaller and cheaper to manufacture.

Finally, the practical implementation of the embodiments and variants described herein is within the capabilities of those skilled in the art based on the functional description provided hereinabove.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image sensor comprising:
   a matrix of pixels, each including:
      a first transistor and a first switch that are coupled in series between an internal node of the pixel and a first node configured to receive a first potential, the first transistor including a gate coupled with a floating diffusion node of the pixel;
      a capacitive element having a first terminal coupled to the floating diffusion node of the pixel; and
      plural assemblies, each including a capacitance and a second switch coupled in series with the capacitance and the capacitance coupled to the internal node of the pixel; and
   a control circuit configured to control, for each pixel, each time a voltage is stored in one of the assemblies of the pixel, an increase of a difference in potential between the floating diffusion node and the internal node of the pixel by a determined value.

2. The sensor according to claim 1, wherein, for each pixel, to control the increase each time a voltage is stored in one of the assemblies of the pixel, the control circuit is configured to control a switching, from a first level to a second level, of a potential applied to a first terminal of the capacitance of the one of the assemblies, the first terminal being opposite to a second terminal of the capacitance that is coupled to the second switch of the one of the assemblies.

3. The sensor according to claim 2, wherein the second level is lower than the first level.

4. The sensor according to claim 1, wherein, for each pixel, to control the increase each time a voltage is stored in one of the assemblies of the pixel, the control circuit is configured to control a switching, from a first level to a second level, of a potential applied to a second terminal of the capacitive element.

5. The sensor according to claim 1, wherein, for each pixel, the control circuit is configured to:
   control, after the increase each time a voltage is stored in one of the assemblies of the pixel, an interruption of a current circulating between the first node and the internal node of the pixel; and
   separate, by a same first duration, the control of the increase, from the control of the interruption of the current, the first duration being identical irrespective of the pixel and the one of the assemblies of the pixel.

6. The sensor according to claim 5, wherein, for each pixel, the control circuit is configured to:
   control the increase by controlling a switching, from a first level to a second level, of a potential applied to a first terminal of the capacitance of the one of the assemblies of the pixel, the terminal being opposite a second terminal of the capacitance that is coupled to the second switch of the one of the assemblies; and control the interruption of a current circulating between the first node and the internal node of the pixel by:

controlling an opening of the first switch of the pixel; or controlling an opening of the second switch of the one of the assemblies of the pixel.

7. The sensor according to claim 5, wherein, for each pixel, the control circuit is configured to:

control the increase by controlling a switching, from a first level to a second level, of a potential applied to a first terminal of the capacitance of the one of the assemblies of the pixel, the terminal being opposite a second terminal of the capacitance that is coupled to the second switch of the one of the assemblies; and control the interruption of a current circulating between the first node and the internal node of the pixel by:

controlling a switching, from the second level to the first level, of a potential applied to a second terminal of the capacitive element; or controlling an opening of the first switch of the pixel; or controlling an opening of the second switch of the one of the assemblies of the pixel.

8. The sensor according to claim 1, wherein, for each pixel, the control circuit is configured, each time a voltage is stored in the one of the assemblies of the pixel, to control a switching of the potential applied to the first node, from a first level to a second level, before the increase.

9. The sensor according to claim 8, wherein, for each pixel, the control circuit is configured, each time a voltage is stored in the one of the assemblies of the pixel, to:

control, after the increase, an interruption of a current circulating between the first node and the internal node of the pixel;

separate, by a first duration, the control of the increase, from the control of the interruption of the current, the first duration being identical irrespective of the pixel and the one of the assemblies of the pixel; and separate, by a second duration, the control of an interruption of the current from the control of the switching, from the first level to the second level, of the potential applied to the first node, the second duration being identical for each pixel and for each of the assemblies of each pixel.

10. The sensor according to claim 8, wherein, for each pixel, the control circuit is configured, each time a voltage is stored in the one of the assemblies of the pixel, to:

maintain the second level of the potential applied to the first node, at least until the interruption of the current;

keep closed the first switch of the pixel and the second switch of the one of the assemblies of the pixel, at least until the interruption of the current; and control an opening of the second switch of the assembly after the interruption of the current.

11. The sensor according to claim 1, wherein, in each of the pixels, the first transistor is coupled as a source-follower and has a source that is not coupled to a constant-bias current source.

12. A method, comprising:

controlling an image sensor that includes a matrix of pixels, each including:

a first transistor and a first switch that are coupled in series between an internal node of the pixel and a first node configured to receive a first potential, a gate of the first transistor being coupled with a floating diffusion node of the pixel;

a capacitive element having a first terminal coupled to the floating diffusion node of the pixel; and plural assemblies, each including a capacitance and a second switch coupled in series with the capacitance and coupling the capacitance to the internal node of the pixel, the controlling including:

storing voltages in the assemblies of the pixels, the storing including, for each pixel, controlling an increase, by a determined value, of a difference in potential between the floating diffusion node and the internal node of the pixel.

13. The method according to claim 12, wherein, for each pixel, controlling the increase comprises:

controlling a switching, from a first level to a second level that is lower than the first level, of a potential applied to a first terminal of the capacitance of the assembly, the first terminal being opposite to a second terminal of the capacitance that is coupled to the second switch of the assembly.

14. The method according to claim 12, wherein, for each pixel, controlling the increase comprises:

a control of a switching, from a first level to a second level that is higher than the first level, of a potential applied to a second terminal of the capacitive element.

15. The method according to claim 12, wherein the storing comprises, after the increase, controlling an interruption of a current circulating between the first node and the internal node of the pixel, for a first duration separating the controlling of the increase, from the controlling of the interruption of the current, the first duration being the same irrespective of the pixel and in which assembly of the pixel the storing is done.

16. The method according to claim 15, wherein the storing comprises, before the increase, controlling a switching of the potential applied to the first node, from a first level to a second level, by separating, by a second duration, controlling of an interruption of the current from the controlling of the switching to the second level of the potential applied to the first node, the second duration being identical irrespective of the pixel and in which assembly of the pixel the storage is done.

17. The method according to claim 16, wherein, during the storing:

keeping the potential applied to the first node at the second level, at least until the interruption of the current;

keeping closed the first switch of the pixel and the second switch of the assembly at least until the interruption of the current; and opening the second switch of the assembly after the interruption of the current.

18. An image sensor comprising:

a matrix of pixels, each including:

a first transistor and a first switch that are coupled in series between an internal node of the pixel and a first node configured to receive a first potential, the first transistor including a gate coupled with a floating diffusion node of the pixel;

a capacitive element having a first terminal coupled to the floating diffusion node of the pixel; and plural assemblies, each including a capacitance and a second switch coupled in series with the capacitance and coupling the capacitance to the internal node of the pixel; and a control circuit configured to control, for each pixel, each time a voltage is stored in one of the assemblies of the pixel:
   an increase, of a determined value, of a difference in potential between the floating diffusion node and the internal node of the pixel; and
   a switching of the potential applied to the first node, from a first level to a second level that is higher than the first level, before the increase.

19. The sensor according to claim 18, wherein, for each pixel, to control the increase each time a voltage is stored in one of the assemblies of the pixel, the control circuit is configured to control a switching, from a third level to a fourth level lower than the third level, of a potential applied to a first terminal of the capacitance of the one of the assemblies, the first terminal being opposite to a second terminal of the capacitance that is coupled to the second switch of the one of the assemblies.

20. The sensor according to claim 18, wherein, for each pixel, to control the increase each time a voltage is stored in one of the assemblies of the pixel, the control circuit is configured to control a switching, from a third level to a fourth level higher than the third level, of a potential applied to a second terminal of the capacitive element.

* * * * *